United States Patent [19]
Croteau et al.

[11] Patent Number: 5,319,434
[45] Date of Patent: Jun. 7, 1994

[54] LASER RANGEFINDER APPARATUS WITH FIBER OPTIC INTERFACE

[75] Inventors: Michael G. Croteau, Ocoee; Rodney E. Peters, Apopka, both of Fla.

[73] Assignee: Litton Systems, Inc., Beverly Hills, Calif.

[21] Appl. No.: 997,723

[22] Filed: Dec. 30, 1992

[51] Int. Cl.⁵ .......................... G01C 3/08; G02B 6/26
[52] U.S. Cl. ........................... 356/5; 356/28.5; 385/15; 385/16
[58] Field of Search ............... 356/5, 28.5; 385/15, 385/16

[56] References Cited

U.S. PATENT DOCUMENTS

| | | | |
|---|---|---|---|
| 3,724,383 | 4/1973 | Gallaghan et al. | 102/70.2 |
| 4,068,952 | 1/1978 | Erbert et al. | 356/5 |
| 4,121,890 | 10/1978 | Braun | 356/5 |
| 4,391,515 | 7/1983 | Forrester et al. | 356/5 |
| 4,637,716 | 1/1987 | Auweter et al. | 356/28.5 |
| 4,746,211 | 5/1988 | Ruth et al. | 356/28.5 |
| 4,818,071 | 4/1989 | Dyott | 356/28.5 |
| 5,001,338 | 3/1991 | Boero | 250/227.21 |
| 5,031,234 | 7/1991 | Primas et al. | 455/605 |
| 5,054,911 | 10/1991 | Ohishi et al. | 356/5 |
| 5,172,181 | 12/1992 | Morbieu et al. | 356/28.5 |

*Primary Examiner*—Stephen C. Buczinski
*Attorney, Agent, or Firm*—William M. Hobby, III

[57] ABSTRACT

A laser rangefinder apparatus is provided which includes a laser transmitter for transmitting a coherent light pulse over an optical path to a target. The light pulse is reflected from the target as a reflected pulse and travels back to the laser rangefinder over the same optical path. The reflected light pulse is provided to a fiber optic interface module which supplies the pulse to a fiber optic interface cable. The fiber optic interface cable supplies the reflected pulse to a laser receiver. The laser receiver includes a signal processor which performs the distance to target calculation and displays the resultant distance to the user. The fiber optic interface module and fiber optic interface cable permit great flexibility in the placement of the laser receiver with respect to the laser transmitter of the rangefinder.

1 Claim, 2 Drawing Sheets

LASER RANGEFINDER APPARATUS WITH FIBER OPTIC INTERFACE

BACKGROUND OF THE INVENTION

This invention relates in general to optical transceivers and, more particularly, to laser rangefinders.

A laser rangefinder is an optical transceiver which is capable of measuring the distance between the rangefinder and a target in the distance. The laser rangefinder includes a laser light source or laser transmitter, and further includes a photodetector or laser receiver. Typically, the laser transmitter irradiates the target with incident laser light pulses and the laser receiver receives the reflected light pulses. A signal processor in the rangefinder records the time between transmission of a pulse by the laser transmitter and reception of the reflected pulse back at the rangefinder receiver. The signal processor then uses this time difference to calculate the distance between the rangefinder and the target.

In conventional laser rangefinders, great care must be taken to mechanically and optically align the laser transmitter and the laser receiver with respect to each other. That is, optical coupling in prior laser rangefinders was accomplished through the use of discrete coupling optics, namely lenses, which necessitated tight mechanical tolerancing of receivers and transmitters to maintain boresight and field of view (FOV) requirements. Additional fixed optics were also required to ensure power densities which did not exceed the damage threshold level of the photodetector in the laser receiver of the rangefinder. Moreover, with such rangefinders there was little flexibility in the placement of the laser receiver with respect to the laser transmitter.

SUMMARY OF THE INVENTION

One object of the present invention is to provide a laser rangefinder which permits flexibility in selection of the location of the laser receiver with respect to the laser transmitter.

Another object of the present invention is to provide a laser rangefinder which reduces close mechanical tolerancing in the placement of the laser receiver with respect to the laser transmitter.

Yet another object of the present invention is to provide a laser rangefinder with reduced weight and cost.

Still another object of the present invention is to provide a laser rangefinder which protects the photodetector of the laser receiver from focussed laser light In accordance with the present invention, an optical transceiver is provided for transmitting a light pulse to a target and for receiving a reflected light pulse from the target. The transceiver includes an optical transmitter for transmitting a coherent light pulse through an aperture and along an optical path, the light pulse being reflected by the target as a reflected light pulse back along the optical path and through the aperture. The transceiver further includes a fiber optic cable having first and second ends, the first end of the cable being situated at the optical transmitter to capture the reflected light pulse. The transceiver also includes an optical receiver coupled to the second end of the cable to receive the reflected light pulse when the reflected light pulse returns on the optical path and passes through the cable.

Another embodiment of the optical transceiver of the present invention is disclosed which includes an optical transmitter for transmitting a coherent light pulse through a first aperture and along a first optical path, the light pulse being reflected by the target as a reflected light pulse back along a second optical path and through a second aperture. The transceiver further includes a fiber optic cable having first and second ends, the first end of the cable being situated to capture the reflected light pulse entering the second aperture. The transceiver also includes an optical receiver coupled to the second end of the cable to receive the reflected light pulse when the reflected light pulse passes through the cable.

BRIEF DESCRIPTION OF THE DRAWINGS

The features of the invention believed to be novel are specifically set forth in the appended claims. However, the invention itself, both as to its structure and method of operation, may best be understood by referring to the following description and the accompanying drawings.

DETAILED DESCRIPTION OF THE INVENTION

Figure 1:
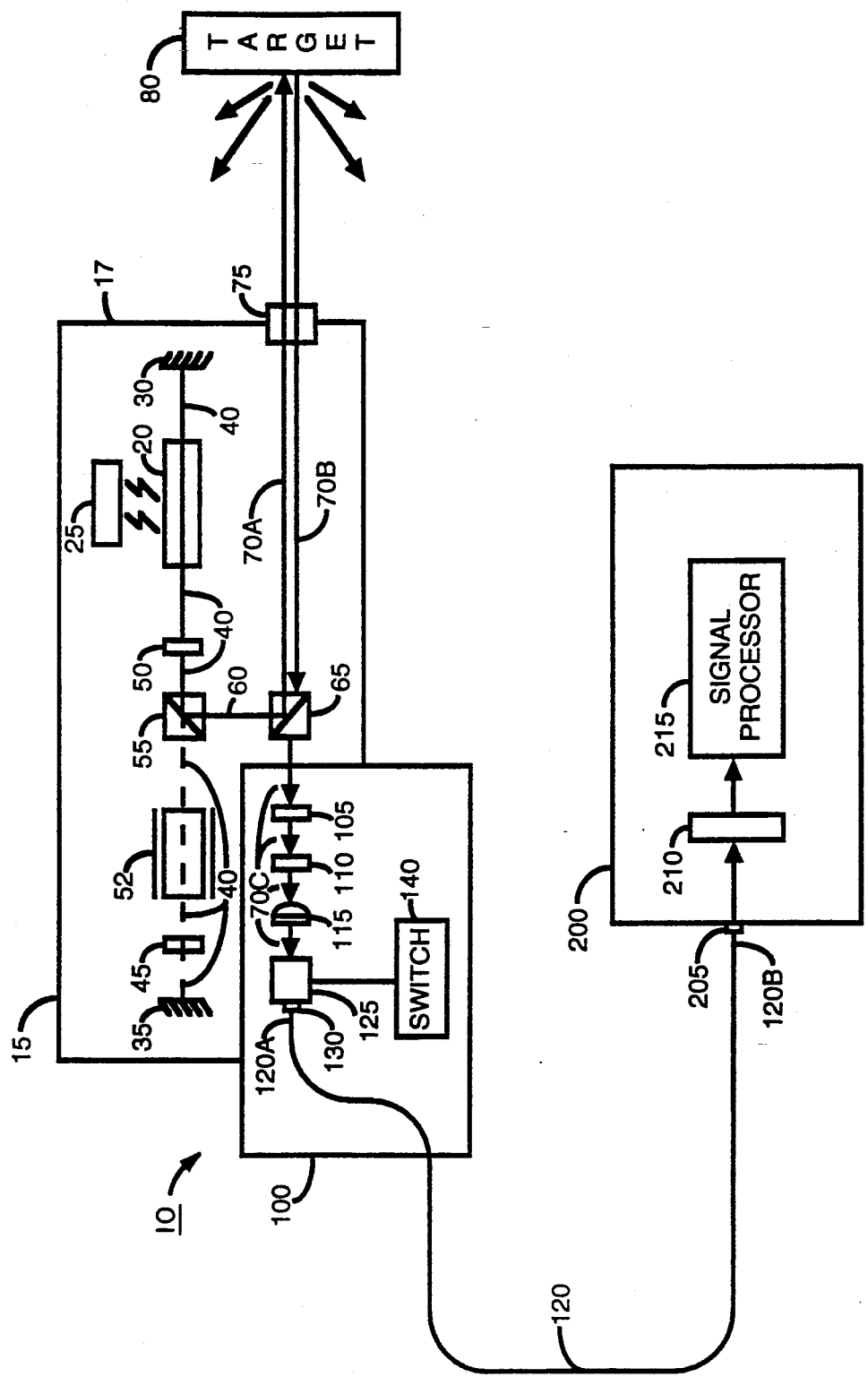
FIG. 1 is a block diagram of a coaxial embodiment of the laser rangefinder of the present invention.

FIG. 1 shows a block diagram of a coaxial embodiment of the laser rangefinder of the present invention as rangefinder 10. Rangefinder 10 includes a laser module 15 which is situated in a sealed housing 17. In this particular embodiment, laser module 15 is a conventional polarization-coupled Q-switch type laser. Laser module 15 thus includes a laser rod 20 which is excited by a flash lamp 25. Laser module 15 also include mirrors 30 and 35 situated in the optical path 40 of laser rod 20 in the conventional manner. Laser module 15 further includes a one quarter wave (λ/4) hold-off waveplate 45 and a reflectivity waveplate 50 situated in path 40 as is typical in this type of laser. A Pockels cell 52 is situated in path 40 next to hold-off waveplate 45 in the conventional manner as illustrated in FIG. 1 .

A beam splitting polarizer 55 is situated in path 40 between Pockels cell 52 and waveplate 50. Polarizer 55 performs the function of an output polarizer in rangefinder 10 and acts as a folding prism to redirect light pulses from path 40 to path 60 upon Q-switching the laser. Light pulses from polarizer 55 in path 60 encounter another beam splitting polarizer 65 which redirects such light pulses through a window 75 and along a path 70A which is incident on target 80.

Light pulses reflect off target 80 back along path 70B and return to beam splitting polarizer 65 as reflected light pulses. In FIG. 1, the incident path 70A to the target and the reflected path 70B from the target have been shown separately for clarity in illustration. In actual practice, however, the path to and from target 80 is the same.

When the reflected unpolarized light pulses from target 80 reach beam splitting polarizer 65, the polarization orthogonal to the transmitted pulse is allowed to pass through polarizer 65 along path 70C to a fiber-optic interface module 100 which is situated adjacent polarizer 65 to capture the reflected light pulses passing therethrough.

When the transmitted light pulses impinge on window 75 on the way to target 80, a certain amount of polarized backscatter results. An absorbing clean-up polarizer 105 is situated in interface 100 adjacent beam splitting polarizer 65 to capture the laser light reflected from window 75 that leaks through polarizer 65. Polarizer 105 exhibits the above mentioned preferred polarization and thus filters most of the backscatter light that otherwise would be coupled into fiber optic interface module 100.

An optical bandpass filter 110 is situated in path 70C adjacent clean-up polarizer 105 to capture reflected light pulses passing therethrough from clean-up polarizer 105. Bandpass filter 110 is typically a narrow bandpass filter exhibiting a bandpass of 15 nm centered at 1064.1 nm, for example. Filter 110 reduces out-of-band optical energy which would otherwise increase the receiver noise power density and reduce the signal to noise ratio of optical receiver 200 which is discussed later.

A focussing lens 115 is situated in path 70C adjacent Q-filter 110 to capture reflected light pulses passing through filter 110. Lens 115 focuses the reflected pulses on a fiber optic interface cable 120 which is coupled at cable end 120A to an electronic shutter 125 by a conventional fiber optic coupler 130. Shutter 125 is coupled to a control switch 135 to enable shutter 125 to be gated to a blocking state or to a transmissive state. Shutter 125 is situated adjacent lens 115 such that reflected light pulses from lens 115 which reach shutter 125 may be gated on and off manually at the command of the rangefinder operator by activating control switch 140 or automatically by a test set (not shown) activating switch 140. It is desirable to turn shutter 130 to the blocking state in alignment scenarios where laser 25 is fired at a very close target which would otherwise result in exposure of receiver 200 to a reflected optical signal exhibiting high and damaging levels of optical energy. In normal operation, however, control switch 140 is activated to keep shutter 125 open and in the transmissive state.

Fiber optic cable 120 extends from cable end 120A to cable end 120B which is coupled by a conventional fiber optic coupler 205 to a photodetector 210 in laser receiver 200. In one embodiment of the invention, fiber optic cable 120 is a large core, multi-mode, step-index fiber. The light output of fiber optic cable 120 is uniformly spread over the entire active area of the photodetector through the action of the dispersive property of cable 120. In this manner, photodetector 210 is protected from concentrated or focussed laser light since the light is spread in the manner described above. Antireflective coatings are placed on fiber optic cable ends 120A and 120B to reduce reflected losses.

While a single frequency laser module 15 is shown in FIG. 1, it is also contemplated that the present invention will be employed with multi-frequency lasers. In that instance, an achromat lens is selected for use as focussing lens 115 so that lens 115 will exhibit the same focal length for all frequencies of light output by the laser and the reflected pulses from the target will be focussed at the same spot on fiber optic cable end 120A.

Photodetector 210 is coupled to a signal processor 215 in laser receiver 200. Signal processor 60 performs the distance to target calculation using the time difference between the time at which the incident pulse was transmitted by laser module 15 and the time at which the corresponding reflected pulse is received at photo detector 210.

Figure 2:
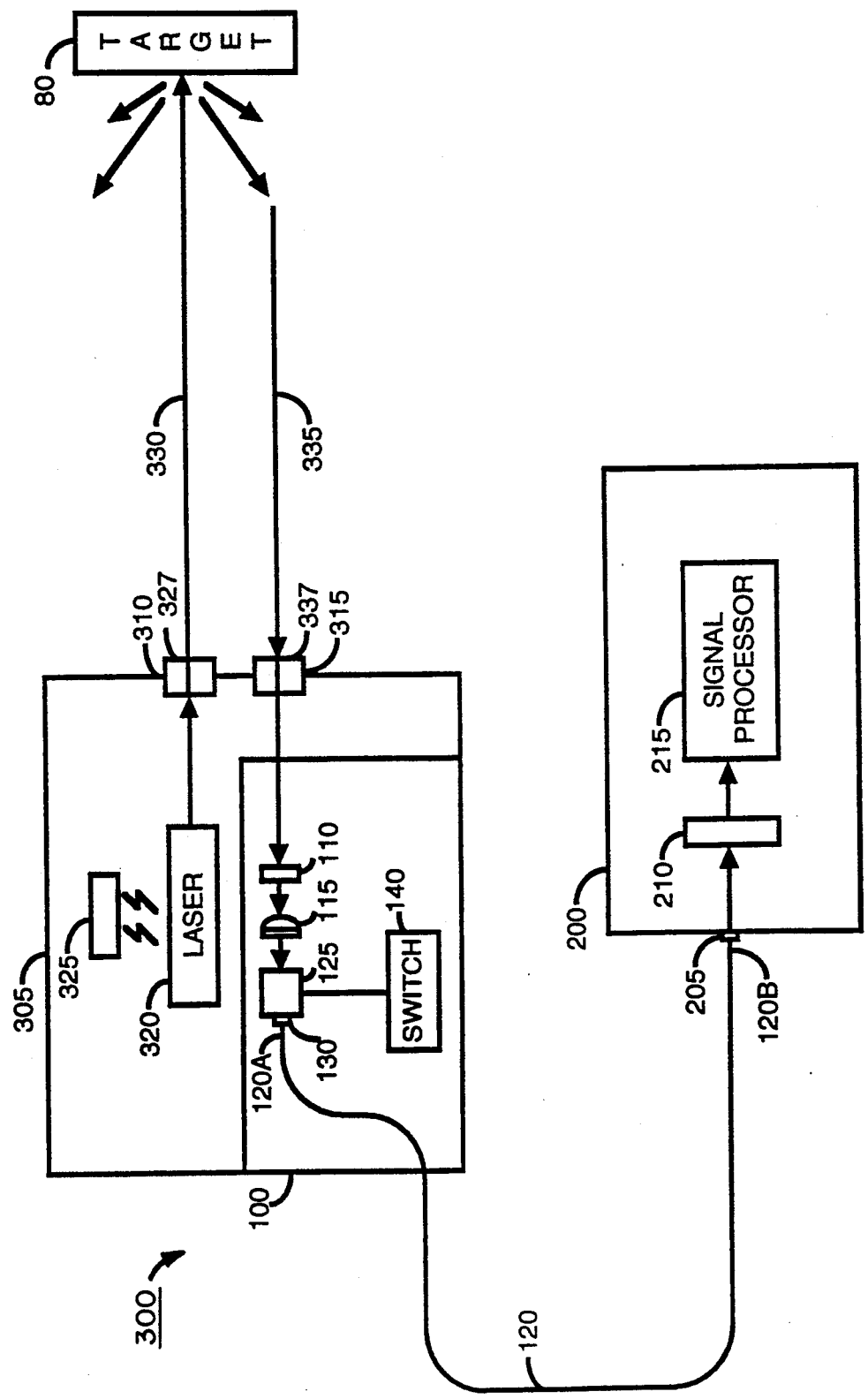
FIG. 2 is a block diagram of a non-coaxial embodiment of the laser rangefinder of the present invention.

FIG. 2 shows a block diagram of another embodiment of the laser rangefinder of the present invention as rangefinder 300. Rangefinder 300 has several components in common with rangefinder 10 of FIG. 1. Like components are indicated by like numbers in FIG.'s 1 and 2. More particularly, FIG. 2 depicts a non-coaxial embodiment of the rangefinder wherein the incident light pulse and the reflected light pulse travel along separate paths and through respective separate apertures in the rangefinder housing. In this embodiment, clean-up polarizer 105 has been eliminated from fiber optic interface module 100 due to the absence of backscatter in this embodiment.

Rangefinder 300 includes a housing 305 having a light transmitting aperture 310 and a light receiving aperture 315. Rangefinder 300 further includes a laser rod 320 which is pumped by flash lamp 325 to cause emission of laser light pulses through a sealed window 327 in aperture 310. Laser 320 is again a Q-switched type like laser 15 described in the coaxial embodiment of FIG. 1. For simplicity, all of the optical components within Q-switched laser 320 have not been repeated in FIG. 2. The laser light pulses generated by laser 320 are transmitted along optical path 330 to target 80. Upon reaching target 80, these pulses are reflected back along path 335 through a sealed window 337 in aperture 315. The reflected light pulses are then processed by bandpass filter 110, achromat lens 115, shutter 125, fiber optic cable 120 and laser receiver 200 in the same manner described earlier with respect to the embodiment of FIG. 1.

Unlike earlier rangefinders, the placement of the receiver in the rangefinders depicted in FIG.'s 1 and 2 with respect to the location of the corresponding transmitter is relatively flexible. For example, in the rangefinder 10 embodiment of FIG. 1, the location of laser receiver 200 is not fixed with respect to the location of transmitter module 15. Similarly, in the rangefinder 300 embodiment of FIG. 2, the location of laser receiver 200 is not fixed with respect to the location of transmitter module 305. Fiber optic interface cable 120 together with fiber optic interface module 100 makes this flexibility of receiver placement possible. It is noted that in the embodiment depicted in FIG. 2, fiber optic interface module 100 need not be physically located within housing 305, but rather can be located at other locations to receive a reflected light pulse from target 80. The fiber optic interface simplifies interchanging of old receivers with new receivers on transmitters by eliminating realignment of the receiver with respect to the transmitter.

In actual practice, fiber optic interface 100 may be mounted in its own housing. In that case, a feed-through optical coupler is employed where cable 120 passes through such housing to avoid breakage of cable 120.

While a laser rangefinder apparatus has been described above, it is clear that a method of operating that rangefinder has also been disclosed. More particularly, one embodiment involves a method for transmitting a light pulse to a target and for receiving a reflected light pulse from the target. That method includes the step of transmitting, by a transmitter, a coherent light pulse along an optical path to a target which reflects the light pulse as a reflected light pulse back to the transmitter along the optical path. The method also includes the step of conveying the reflected light pulse from the transmitter to a receiver over a fiber optic interface cable between the transmitter and the receiver. The method further includes the step of receiving the reflected light pulses by the receiver.

Another embodiment involves a method for transmitting a light pulse to a target and for receiving a reflected light pulse from the target which includes the step of transmitting, by a transmitter, a coherent light pulse along a first optical path to a target which reflects the light pulse as a reflected light pulse along a second optical path. The method also includes the step of conveying the reflected light pulse from the second optical path to a receiver over a fiber optic interface cable between the second optical path and the receiver. The method further includes the step of receiving the reflected light pulses by the receiver.

The foregoing describes has described an optical transceiver or laser rangefinder with numerous advantages over its predecessors. More specifically, a laser rangefinder is provided which permits flexibility in the selection of the location of the laser receiver with respect to the laser transmitter. The disclosed rangefinder also reduces close mechanical tolerancing in the placement of the laser receiver with respect to the laser transmitter. The rangefinder of the invention also protects the photodetector of the laser receiver from focussed laser light since the light output of the fiber optic cable is uniformly spread over the entire active area of the photodetector. Advantageously, when new receivers are interchanged with old receivers on rangefinder transmitters, realignment is not required. Moreover, the disclosed rangefinder exhibits reduced weight and cost due to the elimination of precise mechanical interfaces of the receiver and transmitter volumes.

While only certain preferred features of the invention have been shown by way of illustration, many modifications and changes will occur to those skilled in the art. It is, therefore, to be understood that the present claims are intended to cover all such modifications and changes which fall within the true spirit of the invention.

We claim:

1. An optical transceiver for transmitting a light pulse to a target and for receiving a reflected light pulse from said target comprising:
    an optical transmitter for transmitting a coherent light pulse through an aperture and along an optical path, said light pulse being reflected by said target as a reflected light pulse back along said optical path and through said aperture;
    a fiber optic cable having first and second ends, the first end of said cable being situated at said optical transmitter to capture said reflected light pulse;
    an optical receiver coupled to the second end of said cable to receive said reflected light pulse when said reflected light pulse returns on said optical path and passes through said cable;
    a fiber optic cable interface positioned in the path of the reflected light pulses, said fiber optic cable interface having a cleanup polarizer for blocking back scatter light and an optical band-pass filter to limit the band of light from reflected light pulses passing therethrough and said fiber optical cable interface having focusing optics for focusing reflected light pulses onto said fiber optics cable; and
    a shutter switch positioned in the path of said reflected light pulses for selectively blocking said reflected light pulses from entering said fiber optic cable; whereby said receiver can be readily interchanged with another receiver.

* * * * *